US006687341B1

(12) United States Patent
Koch et al.

(10) Patent No.: US 6,687,341 B1
(45) Date of Patent: Feb. 3, 2004

(54) NETWORK AND METHOD FOR THE SPECIFICATION AND DELIVERY OF CUSTOMIZED INFORMATION CONTENT VIA A TELEPHONE INTERFACE

(75) Inventors: Robert A. Koch, Norcross, GA (US); Arnold Chester McQuaide, Jr., Berkeley Lake, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/469,210

(22) Filed: Dec. 21, 1999

(51) Int. Cl.[7] .................................................. H04M 1/64
(52) U.S. Cl. .............................. 379/88.17; 379/88.13; 379/88.18; 379/88.22; 379/93.12; 379/906; 379/908
(58) Field of Search ......................... 379/67.1, 88.13, 379/88.17, 88.18, 88.22, 43.01, 93.09, 93.12, 900, 906, 908, 88.02, 88.07; 705/36, 37, 38; 704/270, 271, 275; 709/204, 206, 207, 218

(56) References Cited

U.S. PATENT DOCUMENTS

| 5,438,568 A | | 8/1995 | Weisser, Jr. .................... 370/60 |
| 5,557,658 A | * | 9/1996 | Gregorek et al. .............. 379/67 |
| 5,583,920 A | * | 12/1996 | Wheeler, Jr. .................. 379/88 |
| 5,721,827 A | * | 2/1998 | Logan et al. ........... 395/200.47 |
| 5,742,905 A | * | 4/1998 | Pepe et al. .................... 455/461 |
| 5,884,262 A | * | 3/1999 | Wise et al. .................... 704/270 |
| 5,896,444 A | * | 4/1999 | Perlman et al. .......... 379/93.35 |
| 5,917,817 A | * | 6/1999 | Dunn et al. .................... 370/352 |
| 5,933,816 A | * | 8/1999 | Zeanah et al. ................ 705/35 |
| 5,953,392 A | * | 9/1999 | Rhie et al. ................ 379/88.13 |
| 6,018,710 A | * | 1/2000 | Wynblatt et al. ............ 704/260 |
| 6,046,762 A | * | 4/2000 | Sonesh et al. ................. 348/16 |
| 6,233,318 B1 | * | 5/2001 | Picard et al. ............. 379/88.17 |
| 6,331,160 B1 | * | 12/2001 | Bardy ........................ 600/300 |
| 6,353,661 B1 | * | 3/2002 | Bailey, III ................ 379/93.25 |
| 6,381,651 B1 | * | 4/2002 | Nishio et al. ............... 709/245 |
| 6,385,308 B1 | * | 5/2002 | Cohen et al. ............. 379/88.23 |

* cited by examiner

Primary Examiner—Allan Hoosain
(74) Attorney, Agent, or Firm—Kilpatrick & Lockhart LLP (57) ABSTRACT

A communication network for providing customized information content via a telephone. The network includes a database storing a profile of the customized information content, and a server in communication with the database for generating an audio-based interface document of the customized information content based on the profile. The network also includes an AIN in communication with the server and in communication with the telephone. The AIN may include a SSP switch, a service control point (SCP), and an intelligent resource server. The intelligent resource server maps incoming telephone calls to the SSP switch to the audio-based interface document generated by the server.

37 Claims, 3 Drawing Sheets

NETWORK AND METHOD FOR THE SPECIFICATION AND DELIVERY OF CUSTOMIZED INFORMATION CONTENT VIA A TELEPHONE INTERFACE

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention is related generally to communications and, more particularly, to networks and methods for specification and delivery of information via a telephone interface.

2. Description of the Background

One of the hallmarks of today's information age is the ability to receive or access information virtually anywhere. No longer are certain media outlets, such as radio and television, the only resources for up-to-date information. Rather, in today's environment, access to information is ubiquitous. For instance, advancements in the wireless telecommunications industry now permit people to remain in contact with, for example, their family, co-workers, clients, etc., even when they are mobile. Additional advancements in technology now also permit people to access computer networks when they are away from their desktop computer.

In addition, the proliferation of the Internet and its World Wide Web have contributed greatly to the ease of access to information. Examples of how the Internet is used to provide relevant and up-to-date information specific to a user include web sites, such as My Yahoo® (my.yahoo.com) (My Yahoo® is a registered trademark of Yahoo Inc., Santa Clara, Calif.) which allow the user to customize information to be provided on personalized web pages, and news tickers, such as EntryPoint™, from Launchpad Technologies, Inc., Sunnyvale, Calif., which provide "toolbars" appearing on a personal computer user's screen which continuously Of It stream customized information content. Utilizing such web features, a user may specify certain categories of information, such as world news, business news, local news, sports scores and news, stock quotes, weather, television programming, and local movie listings. Information about each of these categories is then displayed to the user each time the service is accessed, such as when the user logs onto their personalized web site. Moreover, the user typically may format the manner in which such information is displayed. In addition, such personalized web sites often include links, such as HTML links, to sites including more detailed information about the information displayed. Accordingly, a user who is displayed a particular headline may then link to another web site containing more detailed and up-to-date information about the story.

In addition to such personal computer (PC) applications, the Internet may now additionally be accessed from some wireless telephones, including the QCP®-2760 and pdQ® wireless telephones from Qualcomm Inc., San Diego, Calif. (QCP and pdQ are federally registered trademarks of Qualcomm Inc.) These wireless telephones include PC-like browsing software for real-time wireless access to, for example, certain text-only versions of popular web sites. The web pages are visually displayed on LCD displays incorporated into the wireless telephones.

Despite the ubiquity of the Internet, however, access to such personalized information content may only be achieved when a personal computer (or similar device) or certain wireless devices, such as the above-described wireless telephones or a personal digital assistant, are available, which may be inconvenient at certain times and locations. In addition, PCs or similar devices are too expensive for some segments of the population, who are, therefore, ill-positioned to benefit from the above-mentioned technological advancements. Accordingly, there exists a need for a mechanism to provide such personalized information content in an easily accessible, inexpensive and efficient manner. There also exists a need for providing such customized information content in an up-to-date, or real-time, fashion.

BRIEF SUMMARY OF INVENTION

The present invention implements a practical manner in which people may access customized information content via a telephone interface. Thus, according to the present invention, the information content may be accessed even when a PC or PC-like device including PC or PC-type browsing software is not available. Moreover, the information content may be "voiced" to a telephone user in lieu of the conventional content-less dial-tone used to indicate connectivity to the telephone network.

A subscriber's customized information content profile is stored in a database. The profile may outline the categories of information for which the subscriber wishes to receive information content, and may be established and customized using, for example, a PC in communication with the database according to conventional PC-type browsing software. According to another embodiment, the information content may be customized using a telephone and audio-based interface formats.

The database is in communication with a server. The server generates an interface document containing the customized information content based on the profile stored in the database each time access to the information is sought. The information content for each of the categories of information in the subscriber's profile may be stored in the database storing the profile, or may be stored in another database in communication with the server. The server generates the interface document in a format suitable for the mode of access. For example, if access is sought using a PC or similar device, the server generates the interface document in a format suitable for the PC-type browsing software. If, however, access is sought using a telephone, the server generates an audio-based interface document. An example of an audio-based interface format is VoiceXML (Voice eXtensible Markup Language), a web interface language having tags, formats, and structures specific to voice applications.

The server is in communication with an Advanced Intelligent Network (AIN) of a telephone network. An AIN is typically integrated with a telephone network to provide call processing features and services that are not realizable within the conventional switching circuit of the telephone network. The AIN may include a Service Switching Point (SSP) switch and an intelligent resource server (IRS) such as, for example, a compact service node (CSN). When access to the customized information is sought via a telephone interface, the "call" is routed to the IRS. The IRS maps the incoming call to the audio-based interface document generated by the server. The IRS also includes an audio-based interface interpreter for converting the audio-based interface document to a voice format, such that the information content may be voiced to a user over the telephone. The telephone may be, for example, a landline telephone in communication with the AIN or a wireless telephone in communication with the AIN via a wireless network.

For an embodiment in which the server generates VoiceXML documents of the information content, the IRS includes a VoiceXML interpreter. The IRS may also include a DTMF decoder to recognize digits or characters dialed by a user of, for example, a touch-tone telephone. Certain combinations of digits and characters may be recognized by the DTMF decoder as commands to jump to certain portions of the information content or to retrieve other audio-based interface documents hosted by sites in communication with the server. In addition, the DTMF decoder may detect when a user no longer wishes to access the information content and instead place an ordinary telephone call.

Whether calls are to be routed from the SSP switch to the IRS may be determined by a service control point (SCP) of the AIN. The SCP is an intelligent network platform of the AIN. When an incoming call is received by the SSP switch, a data packet in the form of a query is sent from the SSP switch to the SCP. The SCP determines whether the caller subscribes to the customized information content service. If so, the SCP routes the call to the IRS, which mediates the communications between the subscriber and the server. If not, the SCP instructs the SSP switch to apply conventional dial-up telephone service.

The SSP switch may send the query messages to the SCP in response to triggers. A trigger in an AIN is an event associated with a particular subscriber line that generates the data packet to be sent from an SSP switch to the SCP. According to one embodiment of the present invention, the trigger is an "off-hook immediate" trigger, such that when a telephone on one of the subscriber lines goes off-hook, the SSP switch queries the SCP. Thus, for a subscriber line the information content may be voiced to a user rather than using the conventional dial-tone, which lacks information content except to indicate connectivity to the telephone network. The trigger may also be a feature code trigger, such that a user of the telephone for a subscriber line may enter a certain code before the SCP routes the call to the IRS. Thus, different users of the same telephone for a particular subscriber line may each access separate personalized information content. Moreover, one user's information content may remain confidential with respect to another user of the same subscriber line.

Accordingly, the present invention provides a manner in which personalized information content may be accessed when a PC or PC-like device is not available. In addition, the present invention provides access to updated personalized information to persons who cannot afford a PC or like device, or who are visually-impaired. Furthermore, the present invention presents a manner in which to convert a formerly content-less information mode in society (i.e., the conventional dial-tone) to a way to disperse personalized information content to users of a telephone. These and other benefits of the present invention will become apparent from the detailed description of the invention hereinbelow.

DESCRIPTION OF THE FIGURES

For the present invention to be clearly understood and readily practiced, the present invention will be described in conjunction with the following figures wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a communication network. For example, certain operating system details and modules of certain of the intelligent platforms of the network are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
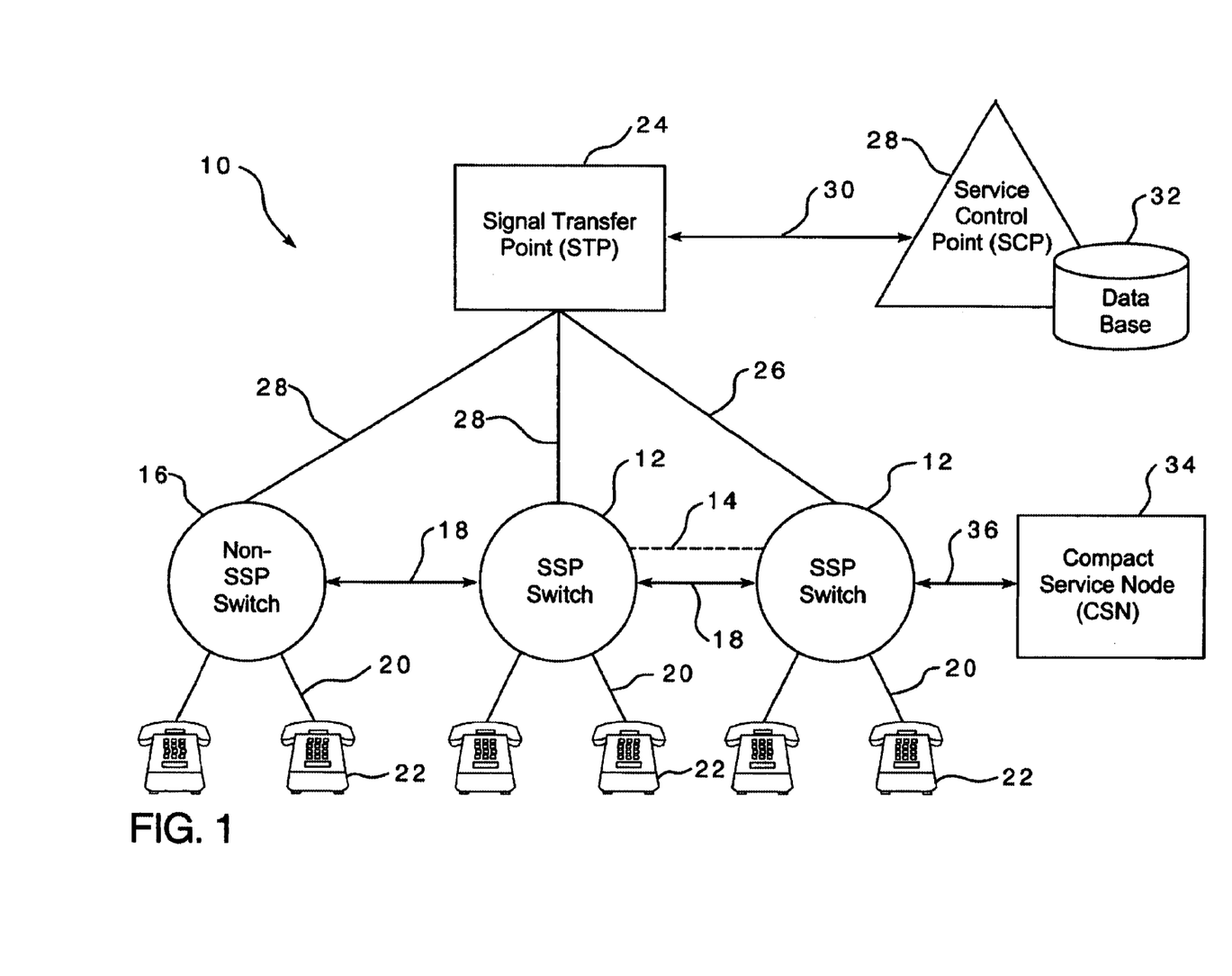
FIG. 1 is a block diagram of a portion of an Advanced Intelligent Network (AIN)

FIG. 1 is a block diagram of a portion of an Advanced Intelligence Network (AIN) 10. The AIN 10 may be employed by a Local Exchange Carrier (LEC) for integration with a Public Switched Telephone Network (PSTN), and may be utilized to allow the LEC to provide call processing features and services that are not embedded within conventional switching circuits of the PSTN.

A typical LEC includes a number of central office switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are data links 18, which may be, for example, trunk circuits.

Each SSP switch 12 and non-SSP switch 16 has a number of subscriber lines 20 connected thereto. The subscriber lines 20 may be, for example, a conventional twisted pair loop circuit connected between the switch 12, 16 and the telephone drop for the customer premises or a trunk circuit, such as a T-1 trunk circuit. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by telephones 22. Alternatively, the terminating equipment may be, for example, a telecopier, a personal computer, a modem, or a private branch exchange (PBX) switching system.

For the AIN 10 illustrated in FIG. 1, each SSP switch 12 and the non-SSP switch 16 is connected to a signal transfer point (STP) 24 via a data link 26. The data links 26 may employ, for example, an SS7 switching protocol. The STP 24 may be a multi-port high speed packet switch that is programmed to respond to the routing information in the appropriate layer of the SS7 protocol, and route the SS7 data packets to its intended destination.

One of the intended destinations of SS7 data packets from the STP 24 is a service control point (SCP) 28. The STP 24 is in communication with the SCP 28 via a data link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by programs, such as a Service Program Applications (SPA), which are run by the SCP 28. The SCP 28 is normally employed to implement high volume routing services, such as call forwarding and 800 number translation and routing. The SCP 28 may also be used for maintenance of and providing access to the network databases for authorization of billing, such as credit card validations. In addition, another of the functions of the SCP 28 is maintenance of the network database 32, which may store subscriber information, such as subscriber call management profiles, used in providing enhanced calling services.

The AIN 10 illustrated in FIG. 1 also includes an intelligent resource server (IRS) 34 such as, for example, a Compact Service Node (CSN) from Lucent Technologies Inc., Murray Hill, N.J. The present invention will be described herein as including a CSN as the IRS 34, although other AIN-compliant IRSs may also be employed such as, for example, an AIN/IP (Intelligent Peripheral) IRS from Nortel Networks Corp., Montreal, Quebec. The CSN 34 may be similar to the SCP 28, and may additionally include voice and DTMF signal recognition devices and voice synthesis devices. The CSN 34 may be used primarily when some enhanced feature or service is needed that requires an audio connection to the call or transfer of a significant amount of data to a subscriber over a switched connection during or following a call. The CSN 34 is typically connected to one or more switches 12, 16 via a data link 36, which may be, for example, an Integrated Service Digital Network (ISDN) or a T1 switching trunk circuit.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be an originating trigger for calls originating from the subscriber premises or terminating triggers for calls terminating at the subscriber premises. The trigger causes a message in the form of a query to be sent from the SSP switch 12 to the SCP 28. The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as result of a customized calling service or enhanced feature. For example, for an enhanced calling feature requiring the voice and DTMF signal recognition devices of the CSN 34, the return message from the SCP 28 may include instructions for the SSP switch 12 to route the call to the CSN 34. In addition, the return message from the SCP 28 may simply be an indication that there in no entry in the database 32 that indicates anything other than conventional telephone service should be provided for the call. The query and return messages may be formatted, for example, according to conventional SS7 TCAP (Transaction Capabilities Application Part) formats.

The AIN 10 illustrated in FIG. 1 includes only one STP 24, one SCP 28, one network database 32, and one SCN 34, although the AIN 10 may further include an additional number of these components as well as other network components which not are included in FIG. 1 for purposes of clarity. For example, the AIN 10 may additionally include redundant STPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24 for routing and servicing calls between different LECs.

Figure 2:
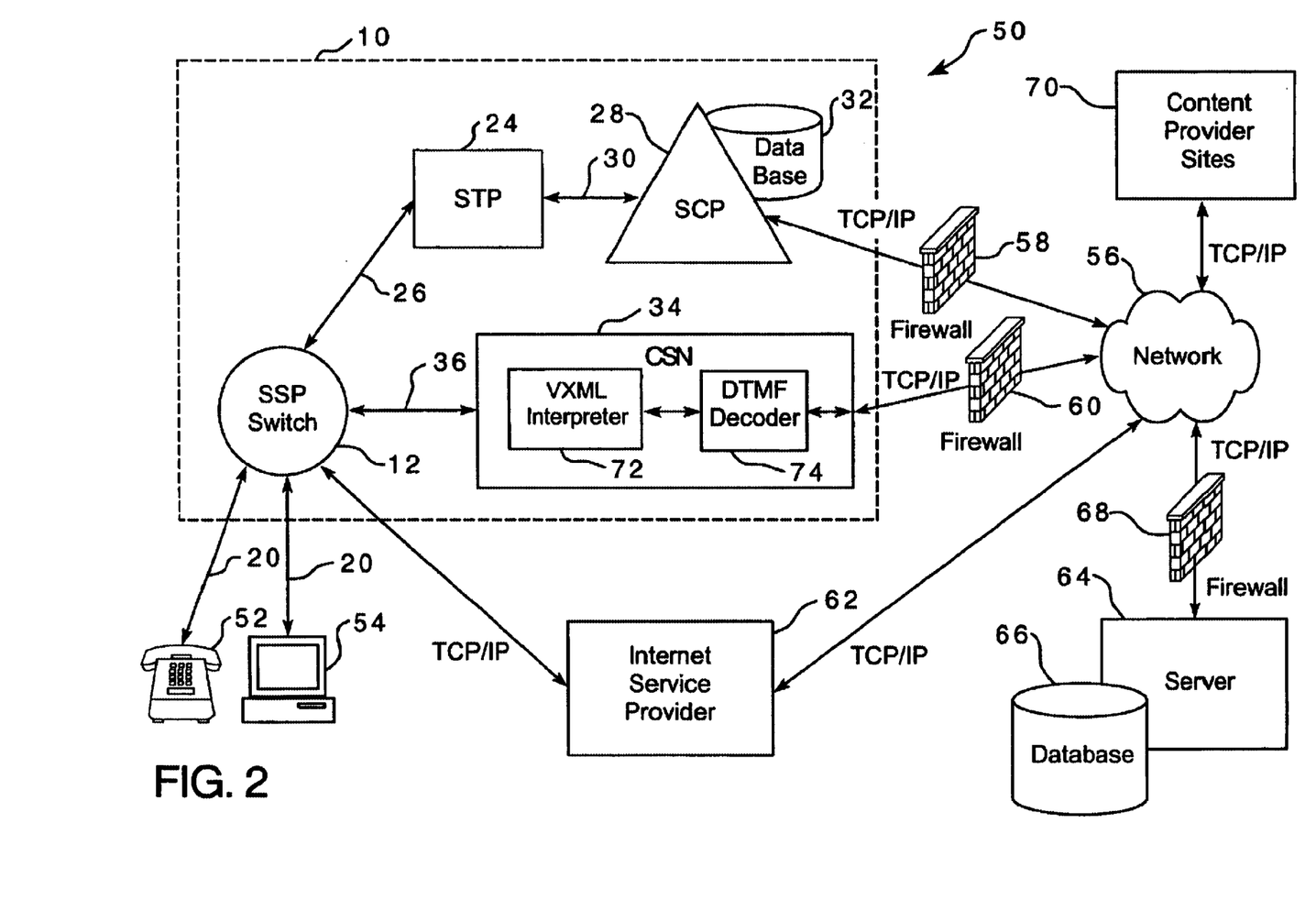
FIG. 2 is a block diagram of a communications network according to one embodiment of the present invention.

FIG. 2 is a block diagram illustrating a communications network 50 according to one embodiment of the present invention. The network 50 includes portions of the AIN 10 illustrated in FIG. 1, including the SSP switch 12, the STP 24, the SCP 28, and the CSN 34. For clarity, only one SSP switch 12, one STP 24, one SCP 28, and one CSN 34 are shown in FIG. 2 although, as discussed hereinbefore, the AIN 10 may include a multiple number of these components. Also as discussed hereinbefore, the subscriber lines 20 interconnect customer premises terminating equipment with the SSP switch 12 of the AIN 10. As illustrated in FIG. 2, the customer premises terminating equipment may include a telephone 52 and a personal computer (PC) 54. Additionally, the customer premises terminating equipment may include, for example, a telecopier, a modem, or a PBX (not shown).

According to one embodiment of the present invention, the SCP 28 and the CSN 34 of the AIN 10 are in communication with a network 56. The network 56 may be, for example, the Internet or an intranet. The network 56 may be in communication with the SCP 28 and the CSN 34 of the AIN 10 via, for example, TCP/IP communications links. Communication with the network 56 permits access and delivery of the customized information content via a telephone interface, as discussed hereinbelow. For security purposes, firewalls 58, 60 may be provided between the network 56 and the AIN 10. In addition, the PC 54 may be in communication with the network 56 via, for example, an Internet Service Provider (ISP) 62 and TCP/IP communications links.

The subscriber's customized information content may be hosted by an active server 64 and an associated database 66. The server 64 may be, for example, a Windows NT® server (Windows NT® is a registered trademark of Microsoft Corp., Redmond, Wash.). The server 64 may be in communication with the network 56 via, for example, a TCP/IP communications link. Again for security purposes, a firewall 68 may be provided between the server 64 and the network 56.

The database 66 may maintain the profile for the subscriber's customized information content. The subscriber's profile may be established and customized as described hereinbelow. In addition, according to one embodiment of the present invention, the database 66 may store, and be continuously updated with, up-to-date information concerning the information categories detailed in the subscriber's information content profile.

According to one embodiment of the present invention, the server 64 generates an interface document of the subscriber's customized information content in real-time each time access to the information content is sought. The server 64 may generate the interface documents according to different formats depending on the mode of access. For example, if the subscriber seeks access to the information content via the PC 54, the server 64 may generate the interface document in a format suitable for the PC-type browsing software such as according to, for example, HTML or XML formats. On the other hand, if the subscriber seeks access to the information content via the telephone 52 (a telephone interface), the server 64 may generate the interface document in a format suitable for the telephone interface, such as according to an audio-based interface format.

An example of such an audio-based interface format is VoiceXML (Voice eXtensible Markup Language), a web interface language having tags, formats, and structures specific to voice applications. The present invention will be described herein as employing VoiceXML capabilities, although other embodiments of the present invention may employ other audio-based interface formats.

As discussed hereinbefore, the database 66 may be updated with information concerning the categories of information of a particular subscriber's profile. The server 64 generates the interface document based on this stored information and the profile stored in the database 66. According to another embodiment, the information concerning the categories of information of the particular subscriber's profile may be hosted by a content provider site 70. The content provider site 70 may host detailed and/or up-to-date (real-time) information regarding the categories of information outlined in the subscriber's profile. The content provider site 70 may be in communication with the server 64 via the network 56 and TCP/IP communications links, and may include an associated database (not shown) for storing the information. The server 64 may generate the interface documents containing a subscriber's information content based on the profile stored in the database 66 and the information content hosted by the content provider site 70. Only one content provider site 70 is illustrated in FIG. 2, although more content provider sites may be in communication with the server 64 via the network 56. According to one embodiment, each of the numerous content provider sites in communication with the server 64 may host information content about different categories of information.

Detailed and/or up-to-date (real time) content for an interface document may be requested from a content provider site 70 by the server 64. The content provider site 70 may host documents such as, for example, World Wide Web documents in a VoiceXML or other audio-based interface format, to which a subscriber may link via the interface document, as described hereinbelow.

The subscriber may access the customized information content through a telephone interface using the AIN 10 capabilities of the communications network 50. When access through the telephone interface is sought, certain specified triggers may be used by the SSP switch 12 to query the SCP 28. The query may be in the format TCAP Information_Analyzed, and may include the telephone number of the calling party. The SCP 28 has knowledge with regard to whether the user is a subscriber to the customized service. The knowledge of whether the user subscribes to the customized service may be maintained by the SCP's database 32. According to another embodiment, such knowledge may be maintained by the server's database 66, with which the SCP 28 may be in communication via the network 56, as described hereinbefore.

The trigger may be, for example, an "off-hook immediate" trigger, such that whenever the telephone 52 for a particular subscriber line 20 goes off-hook, the SSP switch 12 queries the SCP 28 for whether the subscriber of the particular subscriber line 20 is a subscriber to the customized information service. Thus, the present invention may be used to replace a conventional dial-tone, and instead provide customized real-time information content to the subscriber rather than the content-less dial-tone. According to another embodiment, the telephone user may be required to enter a predetermined code when off-hook before being linked to the customized information content. For example, the user of the telephone 52 for a particular subscriber line 20 may dial a certain code, such as "#XX". According to such an embodiment, an AIN feature code trigger may be assigned to the particular subscriber line 20 such that when the user dials the code during an off-hook condition, the SSP switch 12 queries the SCP 28 as to whether the user is a subscriber to the information service. Accordingly, frequent users of the same subscriber line 20 may each access separate customized information content, for example, by having each user enter a separate Personal Identification Number (PIN), which distinguishes their profiles in the database 66. Moreover, a subscriber's customized information content may remain private from other users of the same subscriber line 20. If the user is a subscriber, the SCP 28 returns a message to the SSP switch 12 to route the "call" to the CSN 34. The message may be, for example, a TCAP Analyze_Route message. The message to the CSN 34 may include the telephone number associated with the subscriber.

The CSN 34 may include an audio-based interface format interpreter, such as a VoiceXML interpreter 72. The VoiceXML interpreter 72 may include automatic speech recognition (ASR) and text-to-speech (TTS) translation capabilities. The ASR and TTS functionality of the CSN 34 may be realized by software, such as ASR and TTS software available from Lucent Technologies, Inc., Murray Hill, N.J., run by the CSN 34. The CSN 34 may also include a DTMF decoder 74.

To deliver the personalized information content to the user via the telephone interface, the CSN 34 may, for example, map the incoming call to the audio-based interface document generated by the server 64 for the subscriber. For example, the CSN 34 may map the incoming call and the associated phone number for the subscriber line 20 to a URL address having an IP address of the server 64. For example, if the subscriber's telephone number is 412-555-8670, the VoiceXML interpreter 72 may map the call to the URL <<205.150.50.1/dialtone/4125558670>>, where "205.150.50.1" is the IP address of the server 64, "dialtone" signifies an application to execute, and "4125558670" specifies the subscriber. Once mapped to the appropriate VoiceXML document, the VoiceXML tags may specify actions to be taken by the VoiceXML interpreter 72 of the CSN 34, such as using text-to-speech translation, to present the information content to the telephone user. Thus, the subscriber's pre-specified personalized information content may be voiced to the user over the telephone 52.

The ASR and TTS capabilities of the VoiceXML interpreter 72 and the DTMF decoder 74 permit the telephone user to interface with the presented data of the interface document. For example, the subscriber may "browse" the information by speaking certain keywords recognized by, for example, the ASR capabilities of the VoiceXML interpreter 72. For example, assume a subscriber's customized information content includes information on world headlines, business news, sports, and local movie times. The user could speak a keyword such as, for example, "movies", which is recognized by the ASR functionality of the VoiceXML interpreter 72 and instructs the VoiceXML interpreter 72 to jump to the content portion of the document relating to movies. In addition, the user could speak a keyword such as, for example, "more", if the user wants more detailed or up-to-date information about a particular piece of the information content. Upon detecting a command for more detailed information, the CSN 34 may retrieve other VoiceXML documents through the server 64, such as from the content provider site 70. This operation may be considered similar to clicking on an HTML link for a conventional PC-based browser.

Further, the DTMF decoder 74 may be programmed to recognize the dialing of certain characters, such as from a touch-tone telephone, as interactive commands. For example, the # and * characters of a touch-tone telephone may be used to navigate between VoiceXML pages in a fashion similar to the "Forward" and "Back" buttons of a conventional web-based browser. In addition, when the subscriber desires to place a call while the customized information is being voiced to the subscriber, the subscriber may simply begin dialing the destination number. The DTMF decoder 74 may be programmed to recognize a string of digits starting with a prefix other than, for example, the # or * characters, as the subscriber's request to place a conventional call. The SSP switch 12 may then provide normal call processing to complete the call, and the CSN 34 and server 64 may be taken out of the loop.

The subscriber may customize and establish their information content profile in a variety of fashions. For example, the subscriber may use the PC 54, connected to the network 56 via an the ISP 62, to customize their profile using, for example, conventional web-based browsing software. In addition, the subscriber may customize their profile using the telephone 52 and employing the telephone interface VoiceXML capabilities of the CSN 34, as described hereinbefore.

Figure 3:
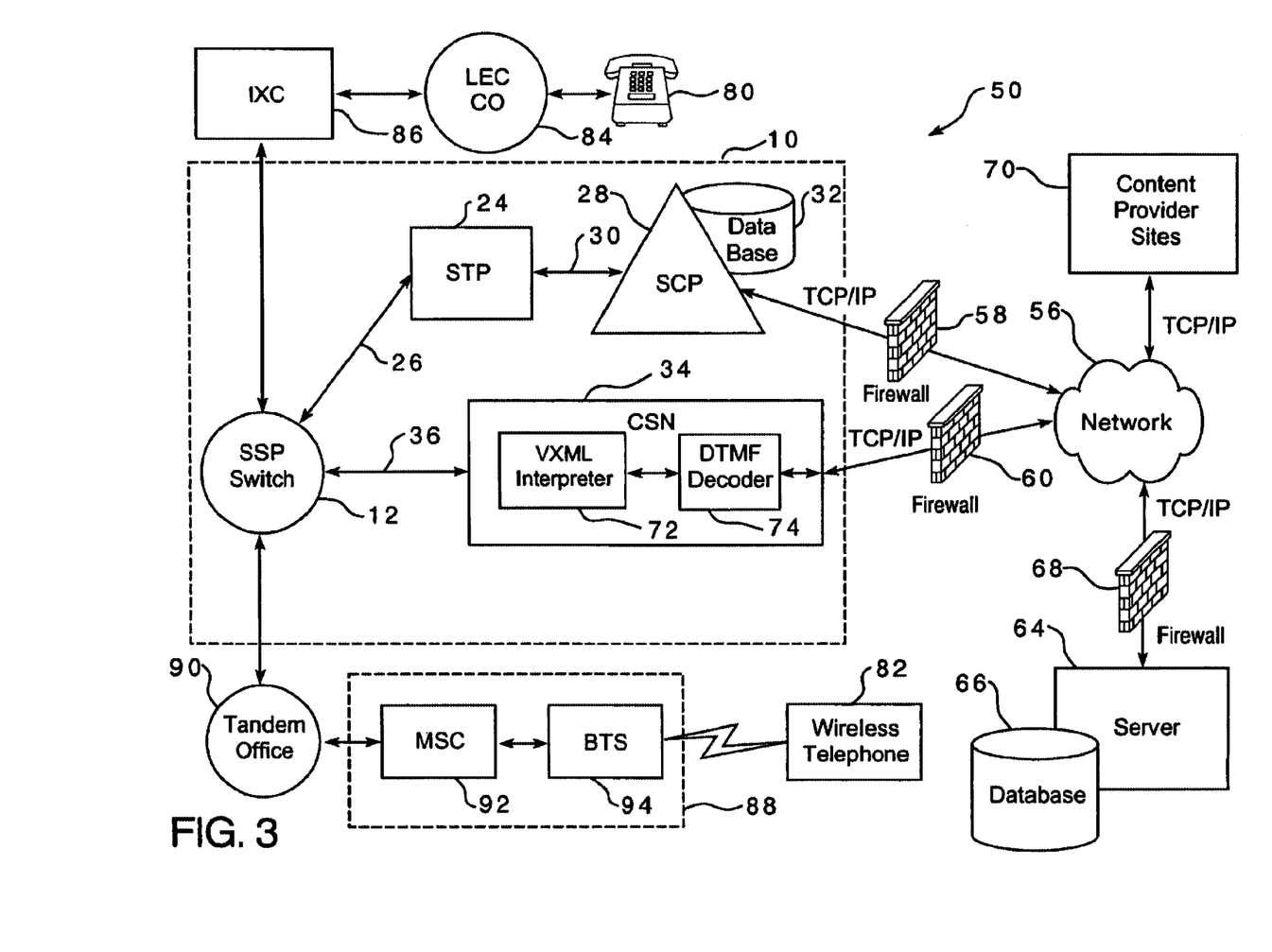
FIG. 3 is a block diagram of a communications network according to another embodiment of the present invention.

The communications network 50 of the present invention may also support remote access to the customized information content hosted by the server 64, as discussed with reference to FIG. 3. The communications network 50 illustrated in FIG. 3 is the similar to that illustrated in FIG. 2, except that the telephone 52 and PC 54 in communication with the SSP switch 12, as well as the ISP 62, have been removed for purposes of clarity. Instead, a different landline telephone 80 and a wireless telephone 82 are shown as being in communication with the SSP switch 12 of the AIN 10. As illustrated in FIG. 3, the landline telephone 80 may be in communication with the SSP switch 12 of the AIN 10 via a LEC central office (CO) 84 and an IntereXchange Office (IXC) 86 interconnecting the LEC CO 84 and the SSP switch 12. The telephone 80 is illustrated in FIG. 3 as being connected to the SSP switch 12 via a different LEC CO 84 and IXC 86, although it should be recognized that the telephone 80 could be interconnected to the SSP switch 12 via a subscriber line 20 or a tandem office.

Also as illustrated in FIG. 3, the wireless telephone 82 may be in communication with the SSP switch 12 of the AIN 10 via a wireless network 88 and a tandem office 90. The wireless network 88 may include, for example, a Mobile Switching Center (MSC) 92 and a base transceiver station (BTS) 94. The wireless telephone 82 may communicate with the BTS 94 via a radio communications link according to an air-interface communications scheme such as, for example, CDMA, TDMA, or GMS. The BTS 94 may communicate with the MSC 92 by, for example, an SS7 switching trunk network or an ISDN. The MSC 92 may be in communication with the SSP switch 12 of the AIN 10 via the tandem office 90.

According to one embodiment, a subscriber may remotely access the customized information content associated with a particular subscriber line 20. That is, when a subscriber is away from his normal telephone 52 (see FIG. 2), access to the information content may be achieved using, for example, the telephone 80 or the wireless telephone 82. According to such as embodiment, using either the telephone 80 or the wireless telephone 82, the subscriber may dial, for example, a toll-free number, which is routed by the SCP 28 of the AIN 10 to the CSN 34, according to conventional AIN call processing capabilities. The CSN 34 may then translate the call to a generic URL such as, for example <<250.150.50.1/dialtone/anonymous>>. The VoiceXML page retrieved from the server 64 corresponding to this URL may prompt the subscriber to enter their subscriber destination telephone number (i.e., the telephone number for the subscriber line 20 for the telephone 52) and a password. The server 64 may then validate the entry and respond by either voicing the customized information content, as described hereinbefore, or reprompting/disallowing the attempt if the verification information is not recognized. Accordingly, remote access to customized, real-time information may be realized.

A subscriber may also establish and customize their information content via the wireless telephone 82. In this case, the subscriber dials, for example, a toll-free number, as described hereinbefore. After the subscriber enters, for example, their telephone number and a password, the server 64 may present a VoiceXML document that results in customized information establishment and modification prompts that allow the subscriber to setup or modify their customized content.

Accordingly, the present invention may be used to deliver customized information content to a subscriber through a telephone interface, such as a landline telephone or a wireless telephone, and obviates the necessity of requiring a PC or PC-like device to achieve such information access. Access to the customized information may be realized by merely taking the telephone "off-hook", at which time the information content is voiced to the subscriber. Thus, the present invention may be used, for example, to replace the conventional content-less dial-tone used to indicate connection to the telephone network. According to another embodiment, the user may enter a certain code by dialing certain digits or characters on the telephone, such as a touch-tone telephone, to access the information. Moreover, the present invention supports ordinary telephone service in that a user may simply dial a destination number to place a call if he does not wish to hear the customized information. In addition, if the remote telephone interface speakerphone capabilities, in effect, hands-free and non-visual access to information content may be realized.

Although the present invention was been described herein with reference to certain embodiments, those of ordinary skill in the art will recognize that many modifications and variations of the present invention may be implemented. The foregoing description and the following claims are intended to cover all such modifications and variations.

What is claimed is:

1. A communications network for providing customized information content from a content provider via a telephone to a user, comprising:

a database storing a profile of the customized information content;

a server in communication with the database for generating an audio-based interface document of the customized information content based on the profile, the audio-based interface document including a voice markup language format, and wherein the server accesses the content provider and obtains real time updated information content from the content provider for the interface document; and an AIN in communication with the server, the AIN including:

a switch in communication with the telephone for detecting an off-hook immediate trigger associated with the telephone; and an intelligent resource server in communication with the switch for routing an incoming communication from the telephone to the server when the switch detects the off-hook immediate trigger associated with the telephone and for voicing the content of the audio-based interface document to the user such that the user hears the customized information content instead of a dialtone when the telephone is in an off-hook condition, wherein the switch is further for routing an outgoing communication from the user to a recipient based on detection by the switch of an indication by the user during the voicing of the customized information content by the intelligent resource server to place the outgoing communication to the recipient.

2. The communications network of claim 1, wherein the intelligent resource server maps the incoming telephone call to a URL having an IP address of the server.

3. The communications network of claim 1, wherein the intelligent resource server includes an interface format interpreter for converting the audio-based interface document to a voice format.

4. The communications network of claim 3, wherein the AIN includes an SCP in communication with the SSP switch.

5. The communications network of claim 4, wherein the SCP is for verifying whether the user is a subscriber by determining if the database includes the profile of the customized information content associated with the telephone in communication with the SSP switch.

6. The communications network of claim 5, wherein the SCP determines if the database includes the profile of the customized information content associated with the telephone in response to a TCAP query message from the SSP switch.

7. The communications network of claim 6, wherein the TCAP query message includes the telephone number for the telephone.

8. The communications network of claim 7, wherein the SSP switch sends the TCAP query message to the SCP in response to the off-hook immediate trigger.

9. The communications network of claim 5, wherein the server is in communication with the AIN via a network.

10. The communications network of claim 9, wherein the network includes a portion of the Internet.

11. The communications network of claim 9, wherein the intelligent resource server is in communication with the network via a TCP/IP communications link.

12. The communications network of claim 11, wherein the SCP is in communication with the network via a TCP/IP communications link.

13. The communications network of claim 4, wherein the intelligent resource server includes automatic speech recognition capabilities.

14. The communications network of claim 4, wherein the intelligent resource server includes a DTMF decoder.

15. The communications network of claim 4, wherein the audio-based interface document includes a VoiceXML document of the customized information content, and the interpreter of the intelligent resource server includes a VoiceXML interpreter.

16. The communications network of claim 4, wherein:

the SCP routes an incoming call to the SSP switch terminating at a predetermined destination number to the intelligent resource server; and the intelligent resource servers maps the incoming call to the audio-based document generated by the server.

17. The communications network of claim 16, wherein the SCP routes an incoming call to the SSP switch from a landline telephone to the intelligent resource server.

18. The communications network of claim 4, wherein the SCP routes an incoming call to the SSP switch from a wireless telephone to the intelligent resource server.

19. The communications network of claim 1, wherein the AIN is further for verifying whether the user is a subscriber of the customized information content.

20. The communication network of claim 19, wherein the AIN is for verifying whether the user is a subscriber based on a PIN entered by the user.

21. The network of claim 1, further comprising a firewall in communication with the AIN and the server.

22. A method for providing customized information content via a telephone interface to a user, comprising:

detecting an off-hook immediate trigger associated with the telephone;

accessing a profile of the customized information content when the off-hook immediate trigger is detected;

accessing information content based on the profile;

obtaining real time updated information content;

generating an audio-based interface document of the customized information content using the real time updated information content, the audio-based interface document including a voice markup language format;

mapping an incoming call to the audio-based interface document; and converting the audio-based interface document to a voice format such that content of the audio-based interface document is voiced to the user instead of a dialtone when the telephone is in an off-hook condition;

detecting an indication by user to place an outgoing communication from the user to a recipient during the voicing of the customized information content; and routing the outgoing communication from the user to the recipient based on detection of the indication by the user to place the outgoing communication to the recipient.

23. The method of claim 22, wherein accessing a profile of the customized information content includes storing a profile of the customized information content in a database.

24. The method of claim 23, wherein accessing information content includes accessing information content stored in the database.

25. The method of claim 23, wherein accessing information content includes accessing information content not stored in the database.

26. The method of claim 23, further comprising:

generating the profile of the customized information content; and storing the profile in the database.

27. The method of claim 22, wherein:

generating an audio-based interface document includes generating a VoiceXML document of the customized information content; and converting the audio-based interface document includes converting the VoiceXML document to a voice format.

28. The method of claim 22, wherein mapping an incoming call to the audio-based document includes:

routing the incoming call to an intelligent resource server; and the intelligent resource server mapping the incoming call to the audio-based interface document.

29. The method of claim 28, wherein routing the incoming call to the intelligent resource server includes routing the call to the intelligent resource server in response to the off-hook immediate trigger.

30. The method of claim 22, further comprising recognizing a request by the user for additional information after detecting the off-hook immediate trigger.

31. The method of claim 30, further comprising:

generating a second audio-based interface document that includes the additional information, the second audio-based interface document including a voice markup language format; and converting the second audio-based interface document to a voice format such that the additional information of the second audio-based interface document is voiced to the user when the telephone is in an off-hook condition.

32. The method of claim 31, wherein generating the second audio-based interface document includes generating the second audio-based interface document in response to detection of a keyword spoken by the user during the voicing of the first audio-based interface document.

33. The method of claim 22, further comprising verifying whether the user is a subscriber of the customized information content.

34. The method of claim 33, wherein verifying whether the user is a subscriber includes verifying whether the user is a subscribed based on a PIN entered by the user.

35. The communications network of claim 1, further comprising means for allowing the user to specify the customized information content.

36. The communications network of claim 35, wherein the means for allowing includes a computer device in communication with the server.

37. The communications network of claim 35, wherein the means for allowing include a telephone device in communication with the server via the AIN.

\* \* \* \* \*